(12) United States Patent
Villeneuve et al.

(10) Patent No.: US 9,561,631 B2
(45) Date of Patent: Feb. 7, 2017

(54) MOLD FOR TIRE HAVING AN ANNULAR INSERT WITH A CONCENTRIC GROOVE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Bernard Villeneuve, Clermont-Ferrand (FR); Christian Gomet, Clermont-Ferrand (FR); David Dean, Clermont-Frerrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/910,527

(22) PCT Filed: Jun. 26, 2014

(86) PCT No.: PCT/IB2014/001208
§ 371 (c)(1),
(2) Date: Feb. 5, 2016

(87) PCT Pub. No.: WO2015/019136
PCT Pub. Date: Feb. 15, 2015

(65) Prior Publication Data
US 2016/0185061 A1    Jun. 30, 2016

(30) Foreign Application Priority Data
Aug. 5, 2013 (FR) .................................... 13 01877

(51) Int. Cl.
*B29D 30/72* (2006.01)
*B29D 30/06* (2006.01)
(Continued)

(52) U.S. Cl.
CPC ........... *B29D 30/72* (2013.01); *B29D 30/0601* (2013.01); *B29D 30/0606* (2013.01);
(Continued)

(58) Field of Classification Search
CPC . B29D 30/0606; B29D 30/0662; B29D 30/72; B29D 2030/0612; B29D 2030/0616; B29C 33/30; B29C 33/306; B29C 33/424
See application file for complete search history.

(56) References Cited

U.S. PATENT DOCUMENTS 1,632,310 A     6/1924  Paynter
1,567,402 A *  12/1925  Venn ..................... B29C 33/424
                                                    152/523
(Continued)

FOREIGN PATENT DOCUMENTS

DE              3046572 A1    7/1982
DE       102007005455 A1    8/2008
(Continued)

*Primary Examiner* — James Mackey
(74) *Attorney, Agent, or Firm* — Dickinson Wright PLLC

(57) ABSTRACT

A mold for vulcanizing and molding a tire, this tire having a tread delimited by two sidewalls, the mold having a ring for molding the tread of the tire and two shells for molding the sidewalls, the mold having an annular groove extending in a recessed manner in one of the shells and an insert housed in the groove, this insert including at least one groove which is concentric with the insert and provided with a section that decreases in the depthwise direction of the groove.

3 Claims, 2 Drawing Sheets

(51) Int. Cl.
 *B29C 33/30* (2006.01)
 *B29K 105/00* (2006.01)

(52) U.S. Cl.
 CPC ........ B29D 30/0662 (2013.01); *B29C 33/306* (2013.01); *B29D 2030/0612* (2013.01); *B29D 2030/0616* (2013.01); *B29D 2030/726* (2013.01); *B29K 2105/258* (2013.01)

(56) References Cited

U.S. PATENT DOCUMENTS

| | | | | | |
|---|---|---|---|---|---|
| 1,969,083 | A | * | 8/1934 | Lawson | ................ B29D 23/24 425/28.1 |
| 2,296,016 | A | | 11/1940 | Bostwick | |
| 2,679,663 | A | * | 6/1954 | Schwemler | ........ B29D 30/0633 425/28.1 |
| 3,204,681 | A | | 9/1965 | Olagnier | |
| 3,518,335 | A | * | 6/1970 | Jablonski | ........... B29D 30/0606 152/523 |
| 4,547,139 | A | | 10/1985 | Hershberger | |
| 5,288,449 | A | | 2/1994 | Mauro | |
| 5,643,519 | A | | 7/1997 | Mauro et al. | |
| 5,939,002 | A | * | 8/1999 | Heindel | ............. B29D 30/0606 249/56 |
| 6,315,539 | B1 | * | 11/2001 | Yutronkie | .......... B29D 30/0606 249/103 |
| 6,942,476 | B2 | * | 9/2005 | Parmelee | ................ B29C 33/32 249/103 |
| 7,384,252 | B2 | * | 6/2008 | Iwamoto | ................. B22F 5/007 419/2 |
| 7,883,326 | B1 | * | 2/2011 | Parmelee | ........... B29D 30/0606 249/103 |
| 8,512,020 | B2 | * | 8/2013 | Lauwers | ............ B29D 30/0629 264/219 |
| 9,150,057 | B2 | * | 10/2015 | Voss | ....................... B60C 11/042 |
| 2004/0032053 | A1 | | 2/2004 | Parmelee | |
| 2011/0180200 | A1 | | 7/2011 | Parmelee | |

FOREIGN PATENT DOCUMENTS

| | | |
|---|---|---|
| EP | 1048489 A1 | 11/2000 |
| FR | 1266628 A | 7/1961 |
| GB | 2341339 A | 8/1998 |
| WO | 02/085595 A1 | 10/2002 |
| WO | 2009/007790 A1 | 1/2009 |

\* cited by examiner

MOLD FOR TIRE HAVING AN ANNULAR INSERT WITH A CONCENTRIC GROOVE

This application is a 371 national phase entry of PCT/IB2014/001208, filed Jun. 26, 2014, which claims the benefit of French Patent Application No. 1301877, filed Aug. 5, 2013, the contents of which are incorporated herein by reference for all purposes.

BACKGROUND

The present disclosure relates to molds for tires. More specifically, it relates to the molding of protuberances on the sidewalls of these tires.

DESCRIPTION OF RELATED ART

Tires provided with lining elements placed on the sidewalls are known. For example, document FR1266628 discloses a tire for an aircraft that takes off at very high speed, said tire being designed to avoid splashes of water and having, on at least one sidewall, a profiled element modifying the usual section, that is to say having an approximately triangular section.

Document EP1048489 discloses a tire having beads, sidewalls and a crown having a reinforcement. In order to deflect the flow of water ejected laterally by this tire while running on ground covered with water, a protuberance bounded by an upper wall radially on the outside and a lower wall radially on the inside is disposed on at least one of the sidewalls.

The production of these protuberances involves particular embodiments of mold elements provided for molding and vulcanization. Moreover, if the dimensions and/or profile of a protuberance change, it may prove necessary to change the entire mold or at least one of the shells, at quite a considerable cost.

Document WO02085595 discloses a method for depositing at least one colored raw rubber compound that forms a contrasting pattern on the external surface of a tire, comprising the following steps of: preparing a green form of tire to be molded, having all of the constituents apart from the colored rubber compound(s); depositing the colored rubber(s) in at least one cavity formed in a removable insert, each cavity having the overall shape of the pattern to be molded and having a total volume V0, the total volume of non-vulcanized colored rubber V1 placed in each cavity being less than the volume V0; mounting the insert in an appropriate housing provided in the molding surface of the tire mold; inserting the green tire into the mold; molding and vulcanizing the tire. The document describes patterns that typically have a round, square, rectangular, etc. shape, and take up a limited angular region of the sidewall.

Document DE3046572 describes a method for inserting a colored code, indication, lettering or sign into the sidewall. This inscription only takes up a limited angular region of the sidewall.

There is thus a need to provide a solution that makes it possible to use molds that are highly suitable for tires provided with such protuberances.

SUMMARY

A first subject of an embodiment of the invention consists in providing a mold specifically designed for molding tires provided with at least one protuberance in the sidewall region.

Another subject of an embodiment of the invention consists in providing a mold for a tire provided with a sidewall portion with a protuberance of given shape, which is likely to change or evolve during the lifetime of the product, or for a similar product.

Yet another subject of an embodiment of the invention consists in providing a mold for a tire with a protuberance, making the demolding operation as easy as possible.

Yet another subject of an embodiment of the invention consists in providing a mold for a tire with a protuberance, making the demolding operation risk-free in terms of damaging the protuberance.

To this end, an embodiment of the invention provides a mold for vulcanizing and molding a tire, this tire comprising a tread delimited by two sidewalls, the mold comprising a ring intended for molding the tread of the tire and two shells for molding the sidewalls, the mold comprising an annular groove extending in a recessed manner in one of the shells and an insert housed in the groove, this insert being annular and having at least one groove which is likewise annular, is concentric with the insert and provided with a section that decreases in the depthwise direction of the groove.

By virtue of such an architecture, the mold according to an embodiment of the invention makes it possible to isolate the elements for molding the protuberance on the sidewall from the other elements of the sidewall such as the overall profile of the sidewall, the marking, etc. Thus, in the event of a modification in the architecture or dimensions of the protuberance, it is possible to change only the insert, while retaining the other elements of the mold that are not affected by the changes. Flexibility in the preparation of molds with possibilities of evolutivity are obtained, at very advantageous costs. Only changing an insert can also make it possible to save time and increase productivity compared with replacing the entire mold.

In another particular embodiment, the insert is formed from a plurality of insert parts that are positioned one after another in the annular groove.

An embodiment of the invention thus proposes manufacturing an annular insert in a plurality of parts. This embodiment also makes it easier to produce the insert. Moreover, since each insert part has limited dimensions, it is easier to fit them into the groove in the shell. In addition, in the event that the profile and/or dimensions of a protuberance is/are modified over a limited angular portion of the sidewall of the tire, only the parts affected by these modifications are replaced. It is thus not necessary to replace all of the insert as described in the related art.

In another embodiment, at least one insert part is produced by laser sintering. This insert part has all or part of the groove in the insert.

The laser sintering method is a method which consists in constructing a part layer by layer by successively superposing layers of powder and selectively fusing this powder. This method may be computer-aided, making it possible to construct complex parts. By using this sintering method for producing insert parts, it is possible to form complex marking means on these insert parts, making it possible to improve the visibility of the marking on a tire sidewall.

In another embodiment, the insert comprises a plurality of grooves.

In another embodiment, each insert part has contact surfaces that serve to interface with adjacent insert parts. At least two insert parts are connected together in a region of their contact surface, this connection being able to be broken in order to separate the two insert parts.

By connecting all or some of the different insert parts together, it is possible to position all of the annular insert in the mold in one go.

During an operation of changing one of the insert parts, it is then sufficient to break the connections holding it to the other insert parts in order to extract it from the mold and replace it with another suitable insert part.

In another embodiment, the shell comprises a through-opening, such as a bore, extending between the insert and the outside of the shell. This type of arrangement makes it possible to introduce a means for removing the shell when the latter is force-fitted in the groove. In a variant, a plurality of openings are distributed around the circumference of the insert, for example one per insert part.

BRIEF DESCRIPTION OF THE DRAWINGS

Further features and advantages of the embodiments of the invention will become apparent from the following description, given by way of nonlimiting example, with reference to the attached drawings, in which.

In the following description, elements which are substantially identical or similar will be denoted by identical references.

DETAILED DESCRIPTION OF THE SPECIFIC EMBODIMENTS

Definitions

A "tire" means all types of resilient tread whether or not it is subjected to an internal pressure.

The "tread" of a tire means a quantity of rubber compound delimited by lateral surfaces and by two main surfaces, one of which is intended to come into contact with a road surface when the tire is running.

The "sidewall" of a tire means a lateral surface of the tire, said surface being disposed between the tread of the tire and a bead of this tire.

The "bead" of a tire means a part of the tire that is intended to be seated on a wheel rim.

A "mold" means a collection of separate molding elements which, when brought closer together, delimit a toroidal molding space 20 for vulcanizing and molding a tire.

The "equatorial plane" means a plane perpendicular to an axis of revolution of the mold, separating this mold into two identical half-molds.

The "meridian plane" means a plane containing the axis of revolution of the mold.

Figure 1:
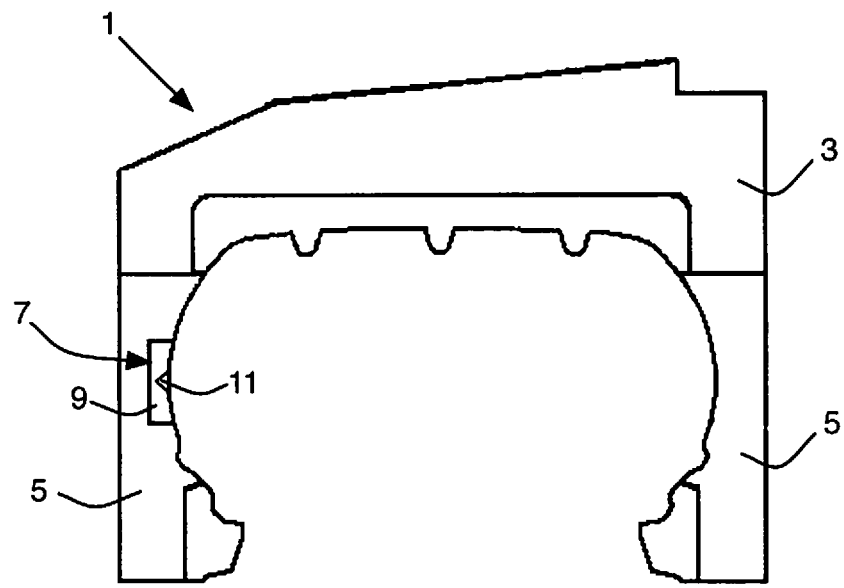
FIG. 1 schematically shows a view in cross section in a meridian plane of a part of a mold according to an embodiment of the invention.

As can be seen in FIG. 1, the mold 1 comprises a ring 3 intended for molding the tread of a tire and two shells 5 for molding the sidewalls. The mold 1 also comprises an annular groove 7 that extends around the circumference of the sidewall and is recessed into one of the shells 5. An insert 9 is mounted in a movable manner in the groove. A groove 11 is provided on the sidewall side of the insert. This groove 11 opens up the volume required to form a protuberance on the sidewall of the tire produced by means of this mold. The profile and the dimensions of the groove are provided as a function of the profile and the dimensions of the protuberance on the tire to be molded.

Figure 2:
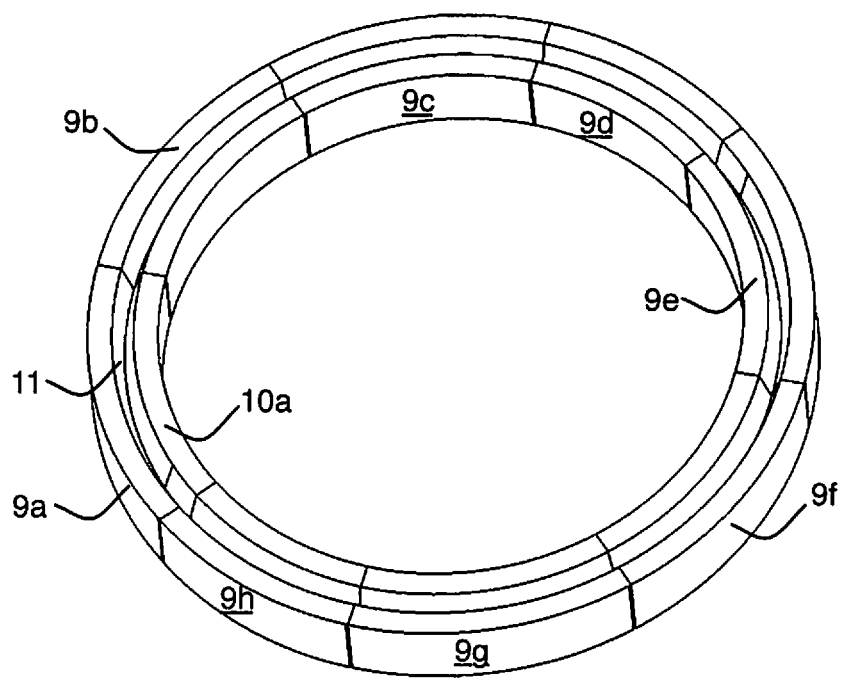
FIG. 2 schematically shows a perspective view of an annular insert suitable for the mold in FIG. 1 and produced according to a first embodiment of the invention.

As shown in the exemplary embodiment in FIG. 2, the insert 9 is advantageously formed from a plurality of insert parts 9a to 9h that are aligned angularly one after another so as to form an annulus with suitable dimensions for insertion in the annular groove 7. In this figure, both the profile and the position of the groove 11 provided in the insert 9 can easily be seen. The groove 11 and the insert 9 are advantageously concentric.

Figure 3:
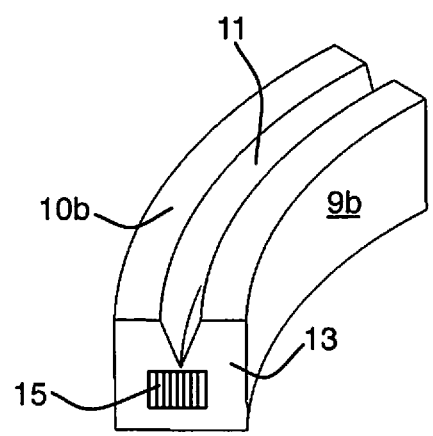
FIG. 3 schematically shows a face of an insert part from FIG. 2 connected to another insert part.

FIG. 3 shows an elevation view of a side face of the insert part 9b, as seen from the part 9a. The interface between the two sections 9a and 9b produces a joining region with a contact surface 13.

A bridge 15, or joining element, makes it possible to fix two adjacent parts of the insert 9 together. In this example, the bridge 15 is provided in the central region of the contact surface 13. In variants, a plurality of bridges can be provided. The profile and the surface of the bridges can vary depending on the embodiment. The bridges are advantageously provided during the manufacture of the insert, in particular when the insert is produced by laser sintering. In order to change an insert part, the bridge(s) connecting the parts in question are broken or cut. The section of the bridges is advantageously provided and dimensioned to make this operation easier. Specifically, even though the parts are separable by breaking the bridges when the insert is removed from the mold, mounting the insert in the mold, preferably with a tight fit, confers sufficient rigidity for the molding operations to be able to be carried out without risking breaking the bridges. Moreover, the insertion of the insert into the shell groove confers solid support for effectively withstanding the molding forces.

Figure 4:
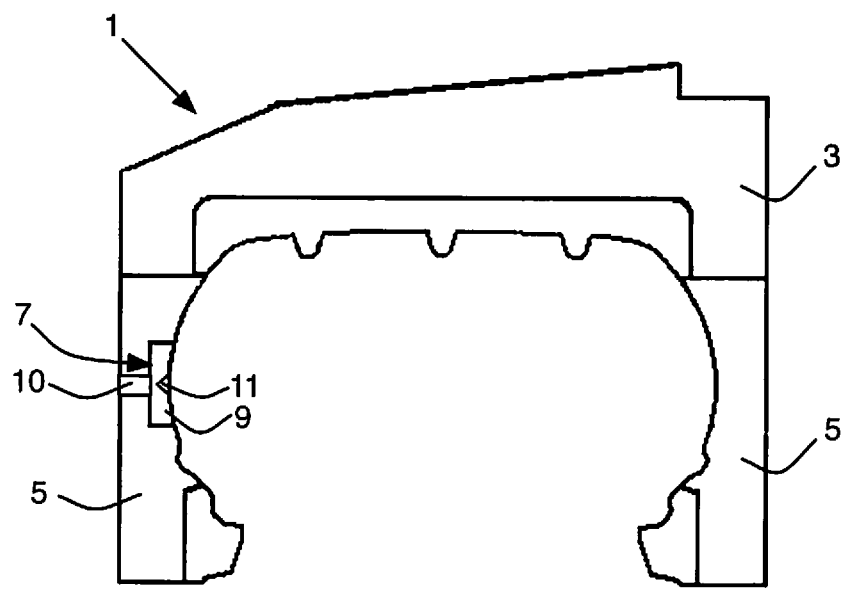
FIG. 4 schematically shows a view in cross section in a meridian plane of a part of a mold according to the invention, having a through-opening that makes it easier to extract the insert.

In the alternative embodiment presented in FIG. 4, a through-orifice 10, such as a bore, provides communication between the outside of the mold and the inside of the mold. This orifice makes it possible to introduce a demolding tool from the outside of the mold in order to make it easier to extract the insert, either as a whole or for one or more insert parts. A plurality of orifices 10 can be distributed angularly around the circumference of the shell.

The figures and their descriptions given above illustrate embodiments of the invention rather than limit it. In particular, the various embodiments of the invention have just been described in relation to a particular example in which the groove is V-shaped, narrowing away from the sidewall of the tire to be molded.

Nonetheless, it is clear to a person skilled in the art that the embodiments of the invention may be extended to other embodiments in which, in the alternative, a different shape, such as a U-shape or W-shape, for example, is provided. According to yet other alternative embodiments, a plurality of concentric grooves can be provided in the insert.

The verbs "comprise" and "have" do not exclude the presence of elements other than those listed in the claims. The word "a/an" preceding an element does not preclude the presence of a plurality of such elements.

The invention claimed is:

1. A mold for vulcanizing and molding a tire, the tire comprising
   a tread delimited by two sidewalls, the mold including
      a ring for molding the tread of the tire and two shells for molding the sidewalls, the mold including at least one annular groove extending in a recessed manner in one of the shells and an insert housed in the annular groove, wherein the insert is annular and has at least one groove which is likewise annular, is concentric with the insert and provided with a section that decreases in the depthwise direction of the at least one groove of the insert, the insert is formed from a plurality of insert parts that are positioned one after another in one of the at least one annular groove of the shell, at least one insert part is produced by laser sintering, the insert part having all or part of the at least one groove in the insert, and each insert part has contact surfaces for contact with adjacent insert parts, and at least two insert parts are connected together in a region of their contact surface, this connection being able to be broken in order to separate the two insert parts.

2. The mold according to claim 1, wherein the insert comprises a plurality of grooves.

3. The mold according to claim 1, wherein the shell includes a through-opening extending between the insert and the outside of the shell.

* * * * *